(12) United States Patent
Woo et al.

(10) Patent No.: US 7,839,586 B2
(45) Date of Patent: *Nov. 23, 2010

(54) LENS DRIVING MODULE

(75) Inventors: Yun Seok Woo, Gunpo-si (KR); Burhanettin Koc, Seongnam-si (KR); Jung Seok Lee, Suwon-si (KR); Hyun Phill Ko, Seongnam-si (KR); Won Seob Oh, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 86 days.

This patent is subject to a terminal disclaimer.

(21) Appl. No.: 12/232,095

(22) Filed: Sep. 10, 2008

(65) Prior Publication Data

US 2009/0268318 A1    Oct. 29, 2009

(30) Foreign Application Priority Data

Apr. 24, 2008    (KR) ..................... 10-2008-0038136

(51) Int. Cl.
G02B 7/02    (2006.01)
(52) U.S. Cl. ....................... 359/824; 359/819; 359/822; 359/823
(58) Field of Classification Search ......... 359/694–701, 359/704, 740, 819, 822–826; 396/72, 78–81, 396/84–87, 133, 349, 448
See application file for complete search history.

(56) References Cited

U.S. PATENT DOCUMENTS

2008/0144201 A1 *    6/2008    Koc et al. .................... 359/824

FOREIGN PATENT DOCUMENTS

JP    2006-098597    4/2006

(Continued)

OTHER PUBLICATIONS

U.S. Appl. No. 12/232,254, filed Sep. 12, 2008, Yun Seok Woo et al., Samsung Electro-Mechanics Co., Ltd.

(Continued)

*Primary Examiner*—Jessica T Stultz
*Assistant Examiner*—Mahidere S Sahle

(57) ABSTRACT

Provided is a lens driving module including a housing that has a lens barrel housing portion provided in the central portion thereof, the lens barrel housing portion having a bearing coupling portion and a guide coupling portion provided therein, and a through-hole formed in one corner thereof where the guide coupling portion is formed; a lens barrel that has a bearing contact portion and a guide portion formed on the outer circumferential surface thereof and is mounted in the lens barrel housing portion of the housing such that the bearing contact portion and the guide portion correspond to the bearing coupling portion and the guide coupling portion of the lens barrel housing portion, respectively; a piezoelectric motor that is mounted in the through-hole formed in one outer corner of the housing, which corresponds to the guide portion of the lens barrel, among the outer corners of the housing; a power connection member that is attached on the outer surface of the piezoelectric motor and of which only a predetermined portion connected to a power supply exhibits conductivity; and a power connection member that surrounds the outer surface of the housing and includes a corner-bent surface having a cross-shaped pad formation portion and a pair of through-holes formed in both sides of the pad formation portion, the through-holes reducing tension.

12 Claims, 8 Drawing Sheets

FOREIGN PATENT DOCUMENTS

| KR | 10-2005-0089394 | 9/2005 |
| KR | 10-2006-0091097 | 8/2006 |
| KR | 10-2007-0083753 | 8/2007 |

OTHER PUBLICATIONS

A non-final Office Action mailed on Mar. 19, 2010 for copending U.S. Appl. No. 12/232,254.

* cited by examiner

[FIG. 1]
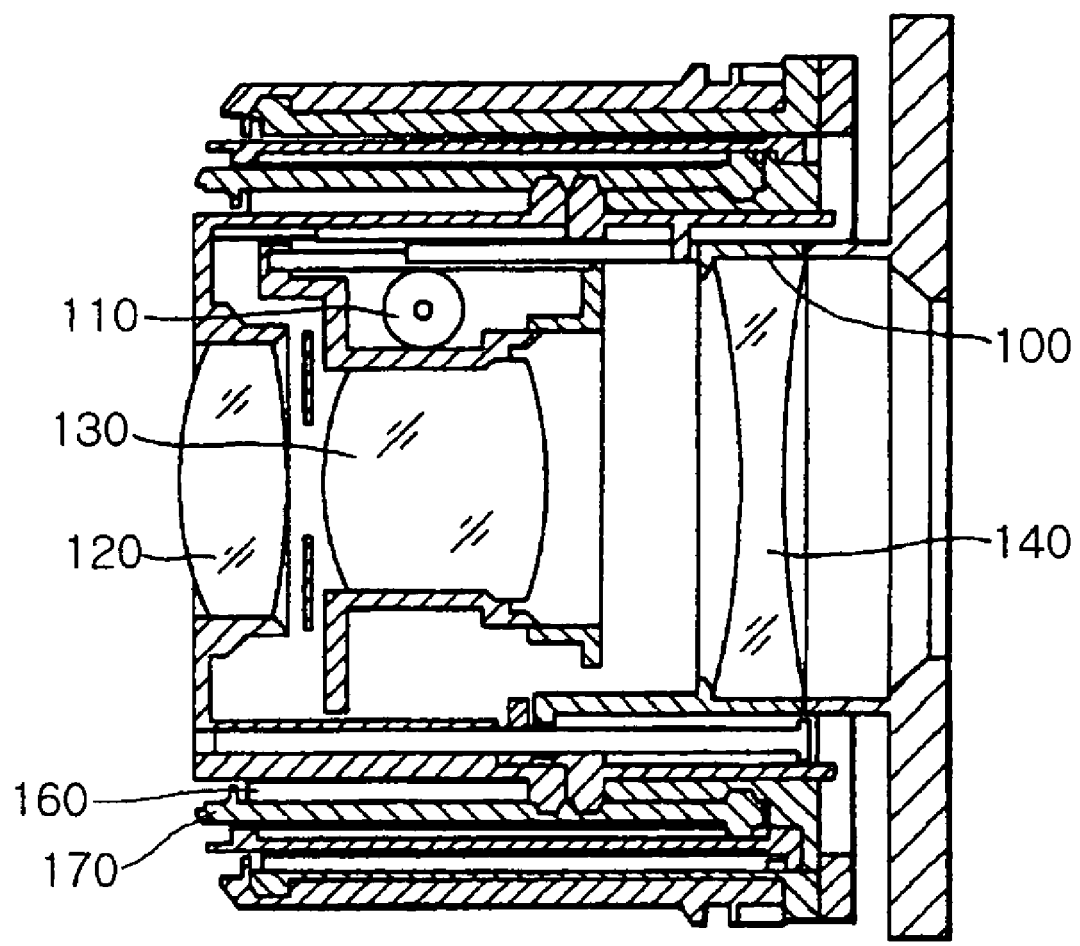
- Prior Art -

[FIG. 2]
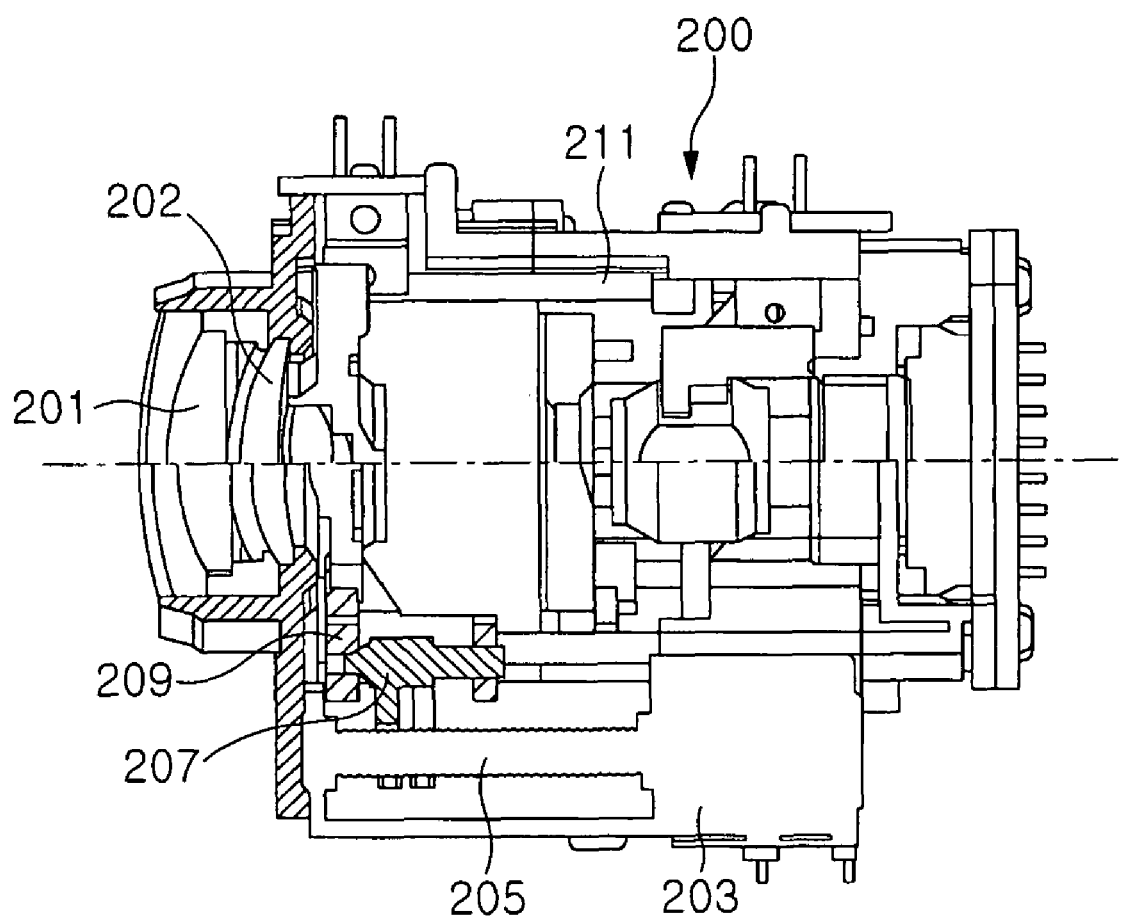
- Prior Art -

[FIG. 3]
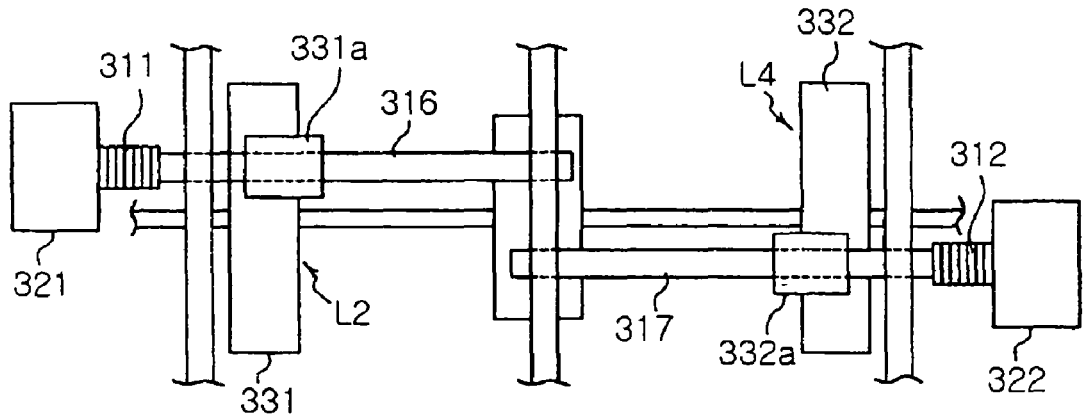
- Prior Art -
[FIG. 4]
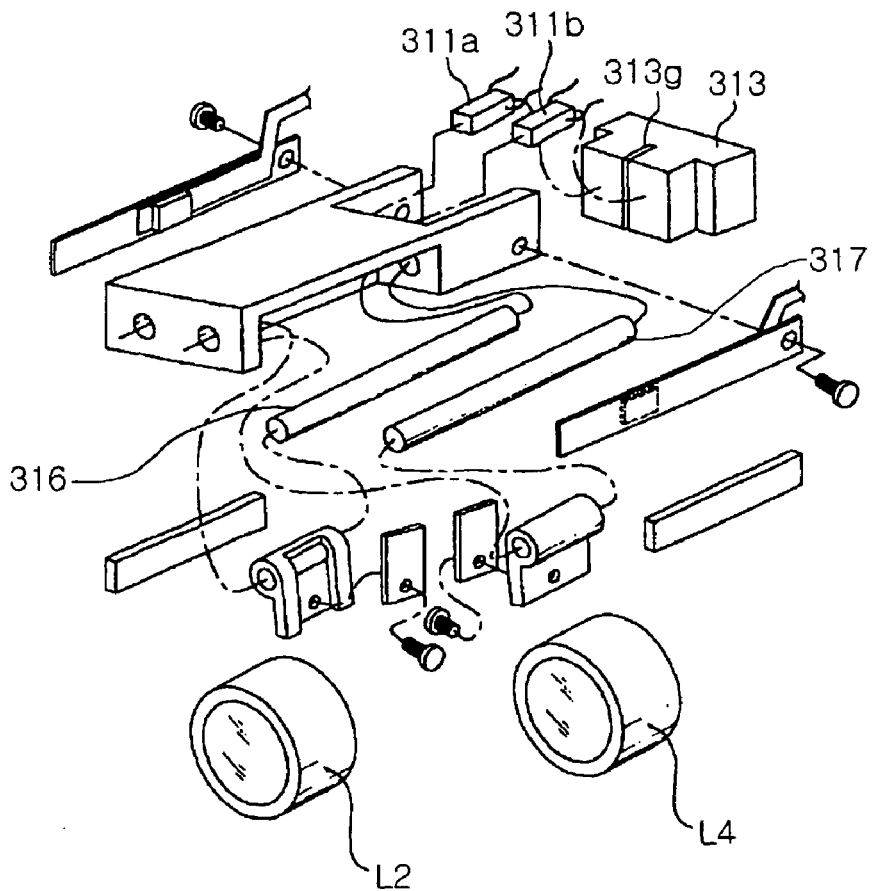
- Prior Art -

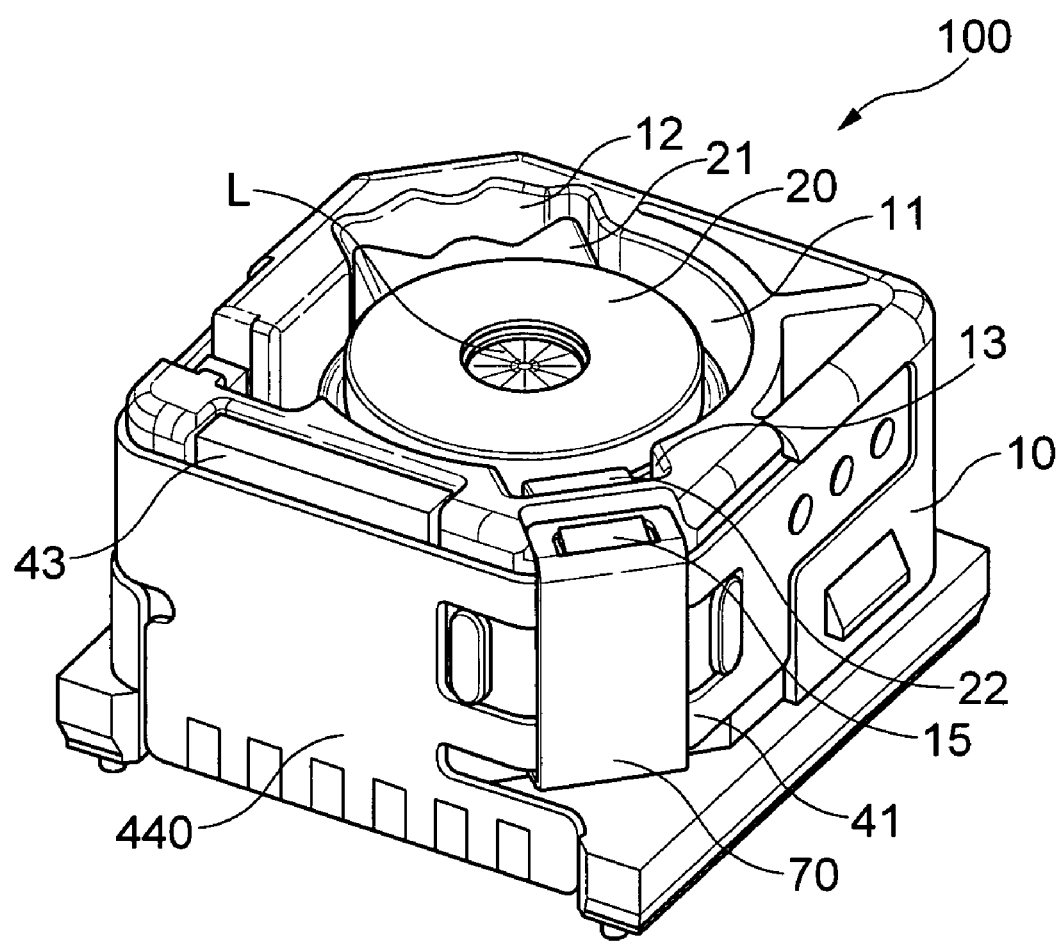
[FIG. 5]

[FIG. 6]
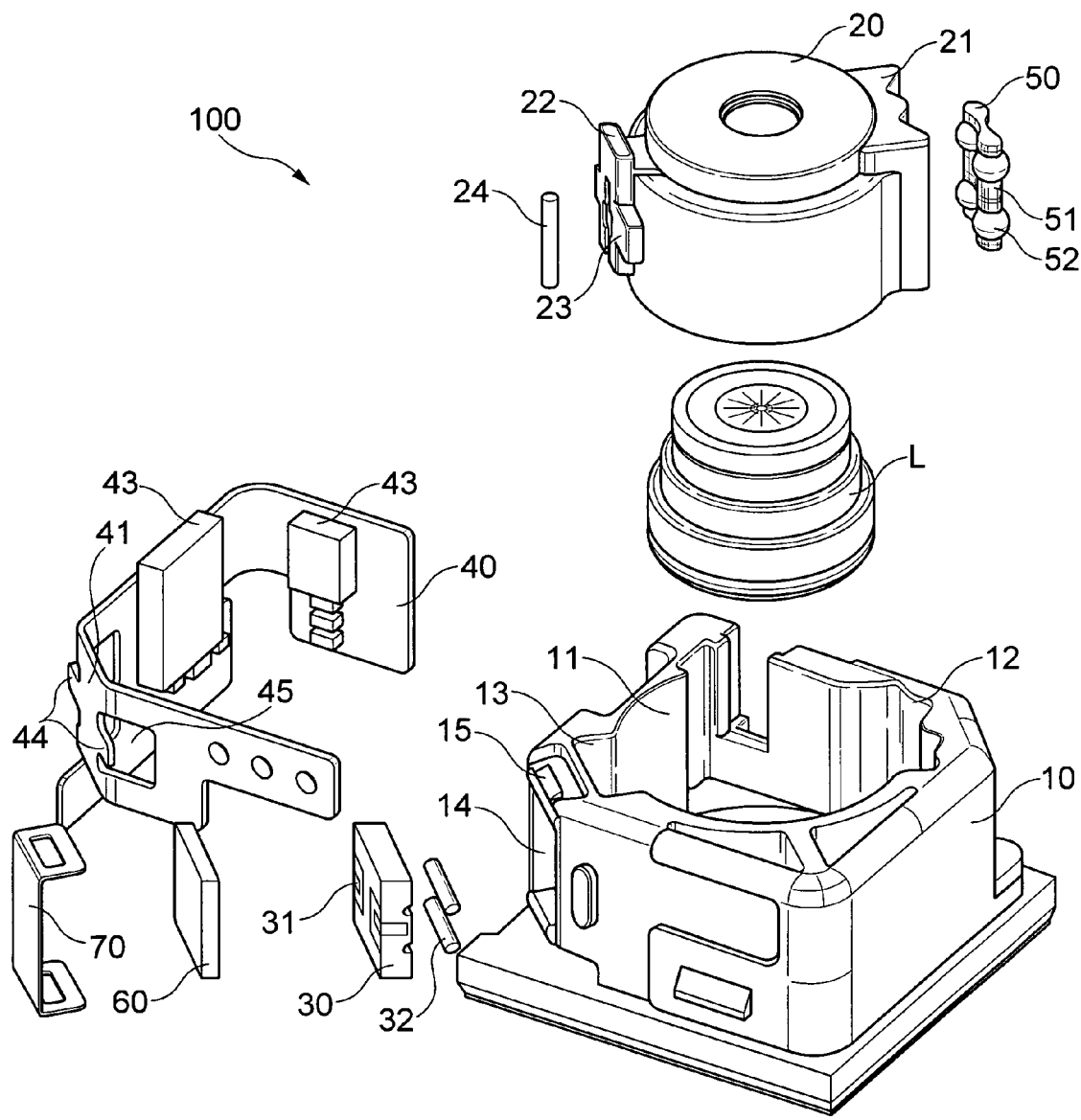

[FIG. 7]
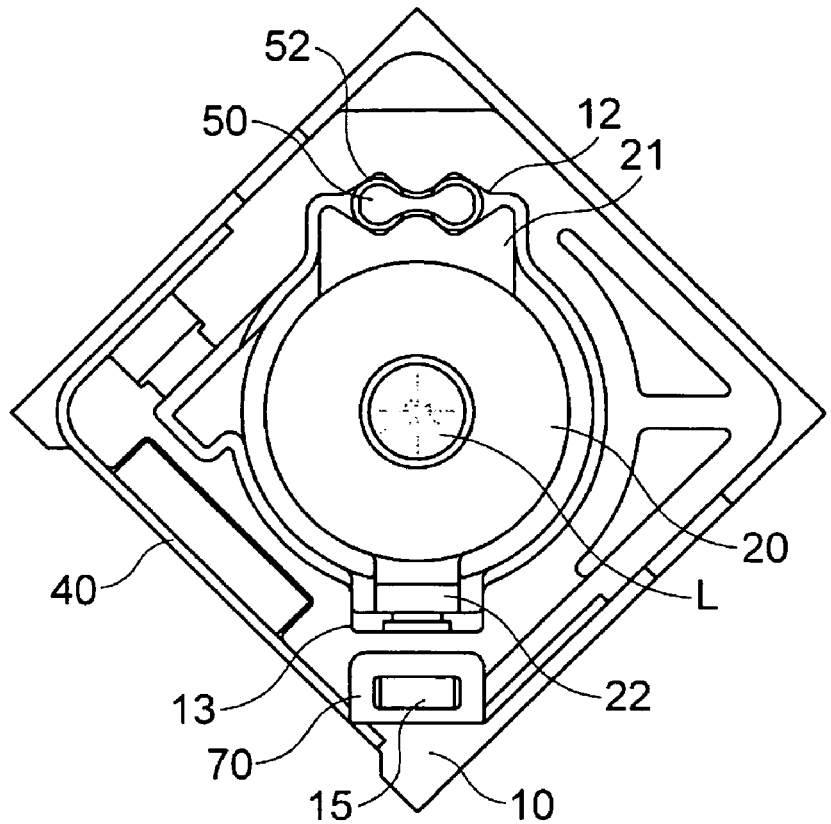
[FIG. 8]
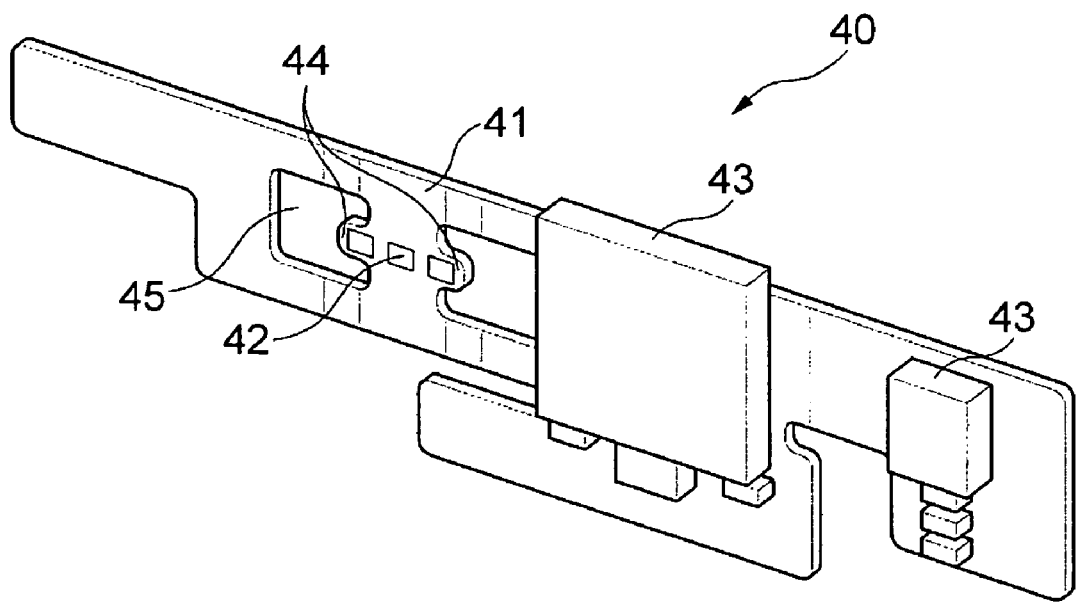

[FIG. 9]
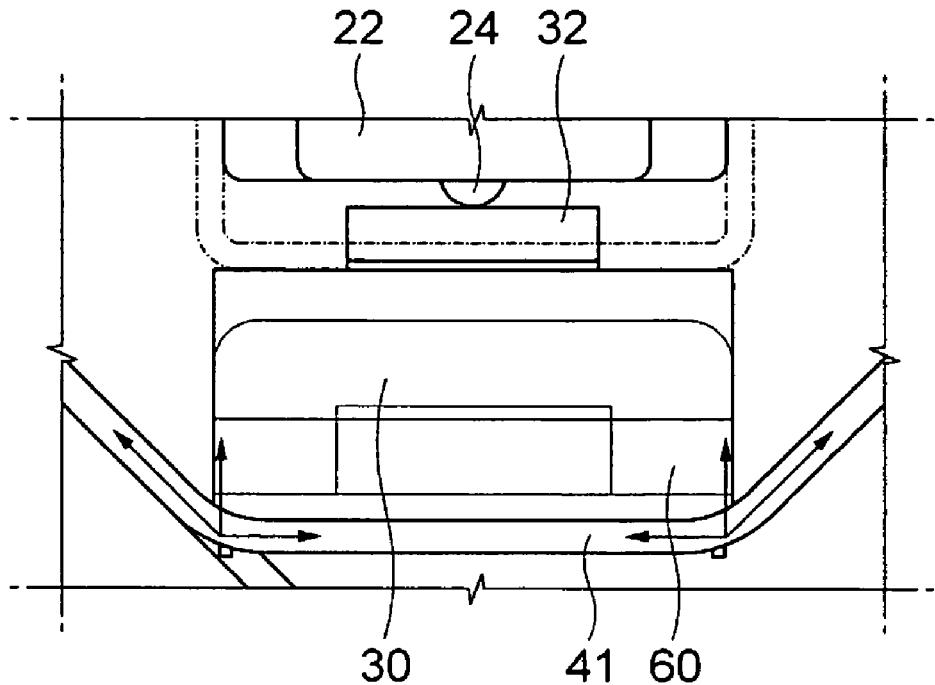
[FIG. 10]
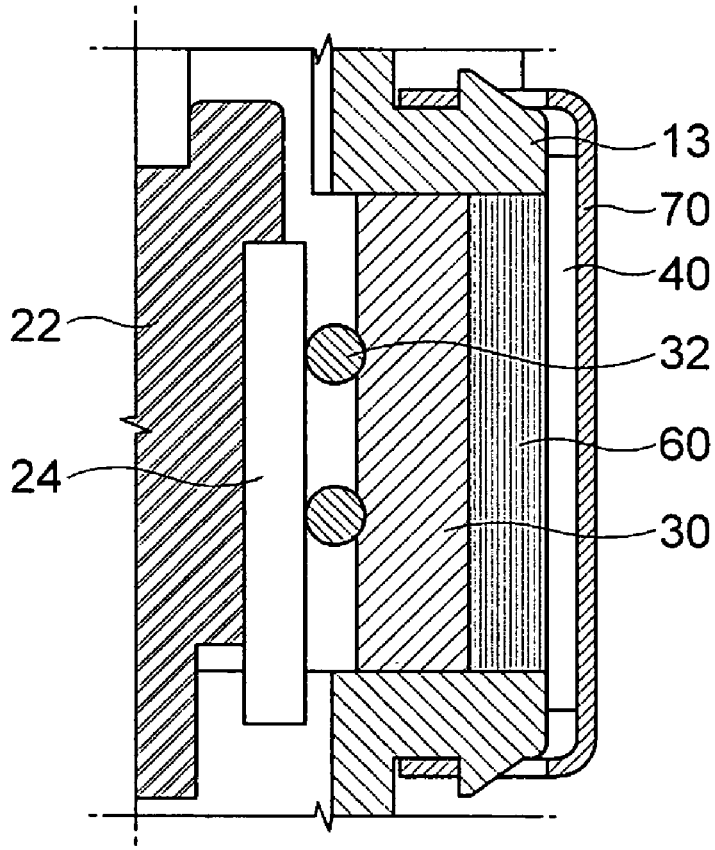

[FIG. 11]
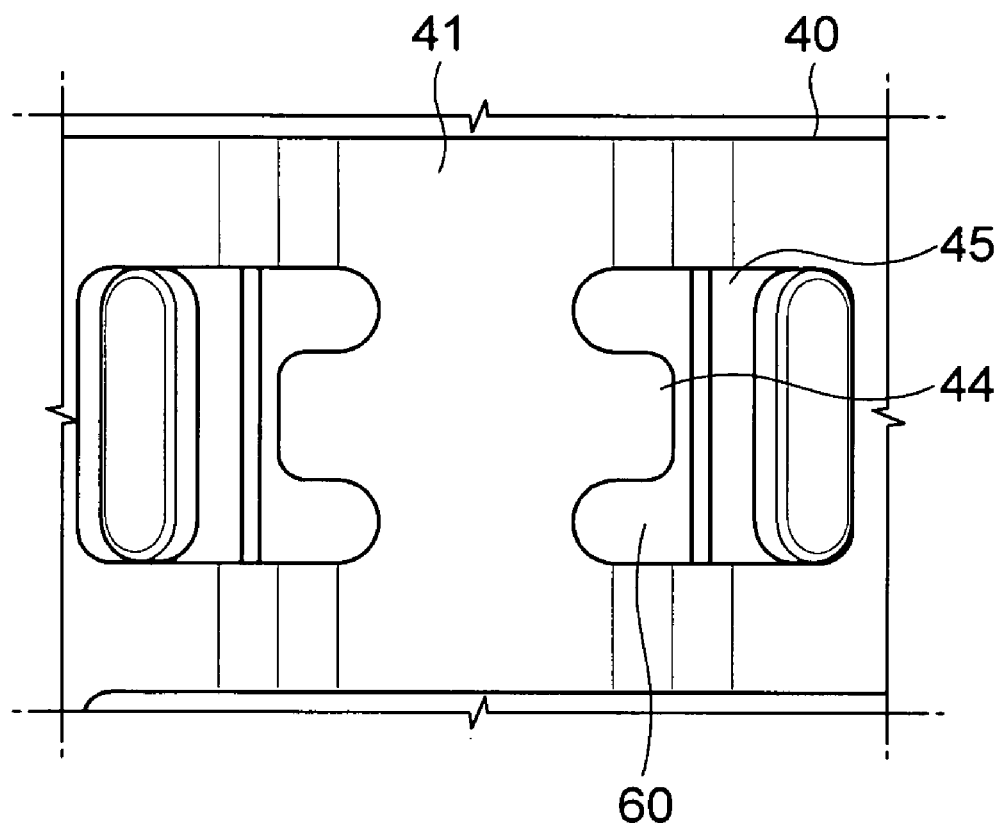

LENS DRIVING MODULE

CROSS-REFERENCE TO RELATED APPLICATIONS

This application claims the benefit of Korean Patent Application No. 10-2008-0038136 filed with the Korea Intellectual Property Office on Apr. 24, 2008, the disclosure of which is incorporated herein by reference.

BACKGROUND OF THE INVENTION

1. Field of the Invention

The present invention relates to a lens driving module which vertically drives a lens barrel.

2. Description of the Related Art

With the development of technology, the resolution of camera modules mounted on mobile terminals, camcorders and so on has changed to several million pixels. Further, various additional functions such as autofocusing and optical zoom have been added to the camera modules.

The camera module performs the autofocusing or optical zoom function by vertically transferring a lens barrel and changing a relative distance. The camera module includes a lens transfer device for vertically driving the lens barrel having lenses stacked therein.

Since such a camera module transfers the lens barrel by using an electromagnetic motor, the number of components built in the camera module increases. As a result, the size of the camera module inevitably increases.

Therefore, when the camera module is mounted in a mobile phone, for example, there are difficulties in assembling the camera module because of a limited space of the mobile phone.

FIG. 1 is a diagram showing the structure of a conventional lens driving device disclosed in U.S. Pat. No. 6,268,970. The conventional lens driving device includes frames supporting lens groups 120, 130, and 140 and cam tubes 160 and 170 supporting the frames. The respective cam tubes support the frames such that the frames can relatively move in the direction of the optical axis of an optical system, and are driven by an actuator 110.

In such a lens driving device, the relative positions of the respective lenses are determined by the shape of a cam. Therefore, a focus lens and a focus adjusting mechanism for adjusting a focus at a specific magnification are additionally required, and a driving mechanism such as a lens holding mechanism, which moves along a final reduction gear and the cam, becomes complex.

FIG. 2 is a diagram showing another conventional lens driving device disclosed in Korean Patent Laid-open Publication No. 2000-55180. The conventional lens driving device includes a fixed lens group 201 coupled to a camera body 200, the fixed lens group 201 including a plurality of lenses. The camera body 200 has a housing space formed therein, and a zoom motor 203 is housed in the housing space. The zoom motor 203 has a shaft coupled to a guide screw 205, and the guide screw 205 has a screw thread and a screw groove formed on the outer circumference thereof. Further, a clip 207 for transmitting power is coupled to the outer circumference of the guide screw 205. The clip 207 has a screw thread and a screw groove formed thereon. The screw thread and the screw groove of the clip 207 have the same shape as the screw thread and the screw groove of the guide screw 205 such that one side of the clip 207 contacted with the guide screw 205 is coupled to the screw thread and the screw groove of the guide screw 205. One side of the clip 207 is coupled to a zoom barrel 209.

The zoom barrel 209 is coupled to a moving lens group 202. The zoom lens barrel 209 is coupled to a guide shaft 211 disposed in an optical-axis direction so as to move along the guide shaft in the optical-axis direction.

In the zoom lens mechanism constructed in such a manner, when the zoom motor 203 rotates, the guide screw 205 is rotated. Then, the torque of the guide screw 205 is converted into a straight-line motion by the clip 207. Therefore, the clip 207 moves straight in the optical-axis direction. As the clip 207 moves straight, the zoom barrel 209 moves along the optical-axis direction. When the zoom barrel 209 moves along the optical-axis direction, a portion of the zoom barrel 209 coming in contact with the guide shaft 211 is slid in such a manner that the zoom barrel 209 can reciprocate in the optical-axis direction.

In the zoom lens mechanism constructed in such a manner, since an electromagnetic motor is used, electromagnetic waves may occur. Therefore, the application of the zoom lens mechanism into small-sized communication devices is limited. Further, since the electromagnetic motor is used, a final reduction gear is used, so that the mechanical structure of the zoom lens mechanism becomes complex. Further, in order to adjust a focus, the zoom lens and the focus lens should be moved independently from each other.

Recently, an ultra-small optical zoom lens mechanism has been developed so as to be applied to a small optical system having a zoom function. In such an ultra-small optical zoom lens mechanism, an electromagnetic motor is not used, but an intellectual element such as a piezoelectric element is mainly used. As the electromagnetic motor is substituted with the piezoelectric element, a driving mechanism for driving a lens can be simplified, which makes it possible to achieve high efficiency.

FIGS. 3 and 4 are diagrams showing a further conventional lens driving device using such a piezoelectric element, disclosed in U.S. Pat. No. 6,215,605. In the conventional lens driving device, piezoelectric actuators 311a and 311b are fixed to base blocks 321 and 322, respectively, and their expansion and contraction are transmitted to driving rods 316 and 317. Then, lenses L2 and L4 are transferred by pre-pressure generated from sliding portions 331a and 332a and an inertia force of lens holders 331 and 332. As the lens holders are transferred or slide with the driving rods in accordance with the waveform of the pressure of the piezoelectric actuators 311a and 311b, the lenses L2 and L4 can be transferred in both directions.

When the displacement of one piezoelectric actuator between adjacent piezoelectric actuators 311a and 311b is transmitted through the base block 313, the displacement may be transmitted to another lens. Therefore, the base block 313 has a groove 313g formed therein so as to prevent the transmission of displacement between the piezoelectric actuators. As the groove is formed, the structure of the lens driving device becomes complex. Further, the displacement interference between the piezoelectric actuators cannot be perfectly removed.

Further, the length of the driving rods 316 and 317, which are moved by the piezoelectric actuators so as to transfer the lenses, is limited depending on the size of the piezoelectric actuators. The limitation of the length of the driving rods causes the limitation of lens transfer distance, thereby having an effect upon product performance.

In this case, since the driving rods are fixed, the length of a barrel having lenses built therein cannot be changed. In addition to a space for the transfer distance of the lenses, a separate space in which other components are arranged is necessary, which makes it difficult to reduce the size of the device.

Further, since only one ends of the lenses are supported by the driving rods, asymmetrical displacement occurs in the lenses such that the lenses are likely to be unstably driven.

SUMMARY OF THE INVENTION

An advantage of the present invention is that it provides a lens driving module in which a piezoelectric motor for vertically driving a lens barrel is disposed in one corner of a housing and is closely fixed by a power connection member having through-holes for reducing tension. Therefore, electrical characteristic defects can be prevented from occurring, and a driving force can be reliably delivered to the lens barrel.

Additional aspects and advantages of the present general inventive concept will be set forth in part in the description which follows and, in part, will be obvious from the description, or may be learned by practice of the general inventive concept.

According to an aspect of the invention, a lens driving module comprises a housing that has a lens barrel housing portion provided in the central portion thereof, the lens barrel housing portion having a bearing coupling portion and a guide coupling portion provided therein, and a through-hole formed in one corner thereof where the guide coupling portion is formed; a lens barrel that has a bearing contact portion and a guide portion formed on the outer circumferential surface thereof and is mounted in the lens barrel housing portion of the housing such that the bearing contact portion and the guide portion correspond to the bearing coupling portion and the guide coupling portion of the lens barrel housing portion, respectively; a piezoelectric motor that is mounted in the through-hole formed in one outer corner of the housing, which corresponds to the guide portion of the lens barrel, among the outer corners of the housing; a power connection member that is attached on the outer surface of the piezoelectric motor and of which only a predetermined portion connected to a power supply exhibits conductivity; and a power connection member that surrounds the outer surface of the housing and includes a corner-bent surface having a cross-shaped pad formation portion and a pair of through-holes formed in both sides of the pad formation portion, the through-holes reducing tension.

The bearing coupling portion and the guide coupling portion of the housing may be formed in the diagonal corners of the housing facing each other, respectively.

The bearing coupling portion of the housing and the bearing contact portion of the lens barrel may have an irregular surface formed thereon.

The lens driving module further comprises a bearing interposed between the bearing coupling portion of the housing and the bearing contact portion of the lens barrel. When the lens barrel is vertically driven, the bearing is rolled.

The guide portion may have a guide member mounted on the central portion thereof and a pair of contact projections formed in both sides of the guide member.

The contact projections may come in surface or point contact with the inner surface of the guide coupling portion of the housing.

The piezoelectric motor may be a hexahedral piezoelectric ultrasonic motor having a plurality of electrode terminals, may have a pair of fiction members installed on the inner surface thereof in parallel to each other, and may be mounted in such a manner that the inner surface thereof comes in contact with the front surface of the guide portion of the lens barrel, thereby delivering a driving force caused by the displacement of the piezoelectric motor to the lens barrel.

The friction members mounted on the inner surface of the piezoelectric motor may come in line or point contact with the guide member mounted on the guide portion in a direction perpendicular to the guide member.

The power connection member may be a flexible printed circuit board (FPCB) of which predetermined positions can be bent.

The power connection member may have a plurality of pads provided on the pad formation portion, and a plurality of electronic components may be mounted on the inner surface of the power connection member where the corner-bent surface is not formed.

The power connection member may be closely coupled by a plate spring which is locked to hooks formed in one corner of the housing.

The power connection member may be closely coupled through adhesive bonding or ultrasonic welding.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a diagram showing the structure of a conventional lens driving device;

FIG. 2 is a diagram showing another conventional lens driving device;

FIGS. 3 and 4 are diagrams showing a further conventional lens driving device;

FIG. 5 is a perspective view of a lens driving module according to the invention;

FIG. 6 is an exploded perspective view of the lens driving module according to the invention;

FIG. 7 is a plan view of the lens driving module according to the invention;

FIG. 8 is a perspective view of a power connection member adopted in the lens driving module according to the invention;

FIG. 9 is a plan view of the lens driving module when the power connection member is coupled;

FIG. 10 is a side cross-sectional view of the lens driving module when the power connection member is coupled; and FIG. 11 is a plan view of the lens driving module when the power connection member is coupled.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, a lens driving module according to the present invention will be described in detail with reference to the accompanying drawings.

FIG. 5 is a perspective view of a lens driving module according to the invention. FIG. 6 is an exploded perspective view of the lens driving module according to the invention. FIG. 7 is a plan view of the lens driving module according to the invention. FIG. 8 is a perspective view of a power connection member adopted in the lens driving module according to the invention.

As shown in FIGS. 5 and 6, the lens driving module 100 according to the invention includes a housing 10, a lens barrel 20 mounted in the housing 10, a piezoelectric motor 30 for vertically driving the lens barrel 20, and a power connection member 40 which fixes the piezoelectric motor 30 and applies power for driving the piezoelectric motor 30.

The housing 10 has a lens barrel housing portion 11 which is formed in a circular groove shape and has an opening portion formed in the center thereof. The lens barrel housing portion 11 has a bearing coupling portion 12 and a guide coupling portion 13 formed in the corners of the housing 10 facing each other in the diagonal direction, respectively.

The bearing coupling portion 12 of the housing 10 has an irregular surface formed thereon. The guide coupling portion 13 formed in the diagonal corner facing the bearing coupling portion 12 has a through-hole 14 to which the piezoelectric motor 30 is coupled.

The cylindrical lens barrel 20 having a plurality of lenses L stacked therein is inserted into the lens barrel housing portion 11. The lens barrel 20 has a bearing contact portion 21 and a guide portion 22 formed on the circumferential surface thereof, the bearing contact portion 21 and the guide portion 22 being disposed in positions facing each other. The lens barrel 20 is inserted into the housing 10 such that the bearing contact portion 21 and the guide portion 22 correspond to the bearing coupling portion 12 and the guide coupling portion 13 of the housing 10, respectively.

The bearing contact portion 21 has an irregular surface formed thereon, like the lens barrel coupling portion 12 corresponding to the bearing contact portion 21.

The lens barrel 20 is mounted in the housing 10 such that a bearing 50 is interposed between the irregular surfaces of the bearing coupling portion 12 and the bearing contact portion 21. The bearing 50 composed of a ball bearing rolls between the irregular surfaces so as to reduce the friction between the housing 10 and the lens barrel 20 such that when a driving force is delivered to the lens barrel 20, the lens barrel 20 can be vertically transferred inside the housing 10.

The bearing 50 has a plurality of balls 52 fixed to a pair of vertical supports 51 which are formed symmetrically with each other. When the lens barrel 20 is vertically transferred by the rolling of the balls 52, the lens barrel 20 is driven along a straight line by the vertical supports 51. Therefore, the lens barrel 20 is prevented from being tilted.

The guide portion 22 formed in the position facing the bearing contact portion 21 has a guide member 24 mounted on the central portion thereof such that the guide member 24 partially projects forward. Further, the guide portion 22 has a pair of contact projections 23 provided in both sides of the guide member 24.

When the lens barrel 20 is mounted in the lens barrel housing portion 11 of the housing 10, the contact projections 23 are coupled to the guide coupling portion 13 in a sliding manner while coming in contact with the inner surface of the guide coupling portion 13. Further, as the outer surfaces of the contact projections 23 come in contact with the inner surface of the guide coupling portion 13, the lens barrel 20 is prevented from being tilted and rotated, when the lens barrel 20 is inserted and vertically driven.

The guide member 24 is vertically driven by the frictional force between a pair of friction members 32 and the guide member 24, the friction force being caused by the displacement of the piezoelectric motor 30. Preferably, the guide member 24 is formed of a ceramic or metallic material having excellent abrasion resistance and a relatively large frictional coefficient. Further, the shape of the guide member 24 is not limited to the cylindrical shape as shown in FIG. 6, but may be set to a semi-circular shape or hexahedral shape which can transmit the frictional force.

In the lens barrel 20 inserted into the housing 10, the bearing coupling portion 21 and the guide portion 22 which are formed on the outer circumferential surface of the lens barrel 20 are disposed so as to face the diagonal corners of the housing 10, respectively. The piezoelectric motor 30 and the bearing 50 are mounted in the diagonal corners of the housing 10, facing the guide portion 22 and the bearing coupling portion 21, respectively.

Therefore, when the lens barrel 20 is vertically driven inside the housing 10, the driving-axis direction of the lens barrel 20 coincides with the optical-axis direction of the lens group L mounted in the lens barrel 10. Accordingly, the lens barrel 20 is vertically driven in the housing 10 without being tilted toward one side.

The piezoelectric motor 30 for vertically driving the lens barrel 20 is mounted in one corner of the housing 10. The piezoelectric motor 30 is inserted into the through-hole 14 formed in the guide coupling portion 13 so as to come in contact with the front surface of the guide portion 22 of the lens barrel 20 which is inserted into the guide coupling portion 13.

The piezoelectric motor 30 is a hexahedral piezoelectric ultrasonic motor having a plurality of piezoelectric bodies stacked therein. The piezoelectric motor 30 has a plurality of electrode terminals 31 formed on the outside thereof. When power is applied through the electrode terminals 31, the piezoelectric motor 30 vibrates in the longitudinal direction thereof and is deformed in the thickness direction thereof.

The piezoelectric motor 30 has the pair of friction members 32 mounted on the inner surface thereof. When the pair of friction members 32 come in contact with the guide member 24 mounted on the guide portion 13 of the lens barrel 20 in a state where the piezoelectric motor 30 is inserted into the through-hole 14, a driving force is generated by the displacement of the piezoelectric motor 30 in the longitudinal and thickness directions thereof. The driving force is transmitted to the lens barrel 20 by the frictional force between the guide member 24 and the friction members 32.

Preferably, the friction members 32 are formed of a ceramic or metallic material of which the frictional coefficient is relatively large, and are formed in the same shape as the guide member 24. However, the shape of the friction members 32 is not limited to the cylindrical shape, but may be set to a semi-circle or a hexahedron.

As the guide member 24 comes in point contact with the friction members 32, the driving force of the piezoelectric motor 30 is transmitted to the guide portion 22 of the lens barrel 20. The friction members 32 are mounted on the inner surface of the piezoelectric motor 30 in a direction perpendicular to the guide member 24.

As the pair of friction members 32 are mounted on the inner surface of the piezoelectric motor 30 in parallel to each other, the driving force caused by the friction between the guide member 24 and the friction members 32 can be reliably transmitted.

Between the piezoelectric motor 30 and the power connection member 40, a conductive buffer member 60 is interposed. The conductive buffer member 60 is formed of elastic synthetic resin, of which only a predetermined portion exhibits conductivity. The pads 42 of the power connection member 40 and the electrode terminals 31 of the piezoelectric motor 30 are electrically connected through the conductive buffer material 60.

As the conductive buffer material 60 is interposed between the piezoelectric motor 30 and the power connection member 40, the displacement of the piezoelectric motor 30 is prevented from being restricted when a corner-bent surface 41 of the power connection member 40 is directly contacted with the electrode terminals 31 of the piezoelectric motor 30 so as to be pressed by the electrode terminals 31. Therefore, the driving force caused by the displacement of the piezoelectric motor 30 is elastically transmitted to the guide portion 22 mounted on the lens barrel 20.

FIGS. 9 to 11 are diagrams showing a state where the power connection member is mounted on the lens driving module of the invention. FIG. 9 is a plan view of the lens driving module when the power connection member is coupled. FIG. 10 is a side cross-sectional view of the lens driving module when the power connection member is coupled. FIG. 11 is a plan view of the lens driving module when the power connection member is coupled.

As shown in FIGS. 9 to 11, the piezoelectric motor 30 is fixed by the power connection member 40 which covers one corner of the housing 10 and three surfaces adjacent to the one corner.

The power connection member 40 is formed of a flexible printed circuit board (FPBC) of which predetermined positions corresponding to the corners of the housing 10 can be bent. The power connection member 40 has a corner-bent surface 41 provided in a position corresponding to the corner of the housing 10, on which the piezoelectric motor 30 is mounted. On the inner surface of the power connection member 40 where the corner-bent surface 41 is not formed, electric components 43 such as IC chips including passive elements are mounted.

The power connection member 40 has a cross-shaped pad formation portion 44 formed on the corner-bent surface 41, and a plurality of electrode pads 42 for applying power to the piezoelectric motor 30 are mounted on the inner surface of the pad formation portion 44.

The power connection member 40 has a pair of through-holes 45 which are symmetrically formed in both sides of the pad formation portion 44. Accordingly, the elasticity of the power connection member 40 formed of an FPBC decreases. Therefore, the pad formation portion 44 is closely attached to the outer surface of the conductive buffer member 60 which is contacted with the piezoelectric motor 30.

That is, the through-holes 45 which are symmetrically formed prevent the pad formation portion 44 from coming off from the surface of the conductive buffer member 60 due to tension which may occur on both bent portions of the corner-bent surface 41 of the power connection member 40. Therefore, the electrode pads 42 for delivering power to the piezoelectric motor 30 are closely attached to the surface of the conductive buffer member 60.

As the tension of the pad formation portion 44 formed in the power connection member 40 is reduced by the through-holes 45 such that the pad formation portion 44 is closely attached to the front surface of the conductive buffer member 60 which is contacted with the piezoelectric motor 30, the elasticity of the conductive buffer member 60 is uniformly transmitted to the piezoelectric motor 30, thereby preventing tilt defects from occurring. Therefore, the electric connection characteristic between the piezoelectric motor 30 and the power connection member 40 through the conductive buffer member 60 is enhanced.

Meanwhile, the piezoelectric motor 30 coupled to one corner of the housing 10, the conductive buffer member 60, and the power connection member 40 are fixed by a plate spring 70 which is closely coupled to the corner of the housing 10, and the upper and lower ends of the plate spring 70 are locked to hooks 15 formed on the housing 10, respectively. Therefore, the piezoelectric motor 30 and the power connection member 40 are reliably mounted on the corner of the housing 10. Alternatively, the piezoelectric motor 30, the conductive buffer member 60, and the power connection member 40 may be fixed through adhesive bonding or ultrasonic welding.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A lens driving module comprising:
   a housing that has a lens barrel housing portion provided in the central portion thereof, the lens barrel housing portion having a bearing coupling portion and a guide coupling portion provided therein, and a through-hole formed in one corner thereof where the guide coupling portion is formed;
   a lens barrel that has a bearing contact portion and a guide portion formed on the outer circumferential surface thereof and is mounted in the lens barrel housing portion of the housing such that the bearing contact portion and the guide portion correspond to the bearing coupling portion and the guide coupling portion of the lens barrel housing portion, respectively;
   a piezoelectric motor that is mounted in the through-hole formed in one outer corner of the housing, which corresponds to the guide portion of the lens barrel, among the outer corners of the housing;
   a power connection member that is attached on the outer surface of the piezoelectric motor and of which only a predetermined portion connected to a power supply exhibits conductivity; and
   a power connection member that surrounds the outer surface of the housing and includes a corner-bent surface having a cross-shaped pad formation portion and a pair of through-holes formed in both sides of the pad formation portion, the through-holes reducing tension.

2. The lens driving module according to claim 1, wherein the bearing coupling portion and the guide coupling portion of the housing are formed in the diagonal corners of the housing facing each other, respectively.

3. The lens driving module according to claim 2, wherein the bearing coupling portion of the housing and the bearing contact portion of the lens barrel have an irregular surface formed thereon.

4. The lens driving module according to claim 1 further comprising:
   a bearing interposed between the bearing coupling portion of the housing and the bearing contact portion of the lens barrel, wherein
   when the lens barrel is vertically driven, the bearing is rolled.

5. The lens driving module according to claim 1, wherein the guide portion has a guide member mounted on the central portion thereof and a pair of contact projections formed in both sides of the guide member.

6. The lens driving module according to claim 5, wherein the contact projections come in surface or point contact with the inner surface of the guide coupling portion of the housing.

7. The lens driving module according to claim 1, wherein the piezoelectric motor is a hexahedral piezoelectric ultrasonic motor having a plurality of electrode terminals, has a pair of fiction members installed on the inner surface thereof in parallel to each other, and is mounted in such a manner that the inner surface thereof comes in contact with the front surface of the guide portion of the lens barrel, thereby delivering a driving force caused by the displacement of the piezoelectric motor to the lens barrel.

8. The lens driving module according to claim 7, wherein the friction members mounted on the inner surface of the piezoelectric motor come in line or point contact with the guide member mounted on the guide portion in a direction perpendicular to the guide member.

9. The lens driving module according to claim 1, wherein the power connection member is a flexible printed circuit board (FPCB) of which predetermined positions can be bent.

10. The lens driving module according to claim 9, wherein the power connection member has a plurality of pads provided on the pad formation portion, and a plurality of electronic components are mounted on the inner surface of the power connection member where the corner-bent surface is not formed.

11. The lens driving module according to claim 10, wherein the power connection member is fixed by a plate spring which is closely coupled to one corner of the housing corresponding to the corner-bent surface, the plate spring having upper and lower ends locked to hooks formed in the corner of the housing.

12. The lens driving module according to claim 10, wherein the power connection member is closely coupled through adhesive bonding or ultrasonic welding.

* * * * *

UNITED STATES PATENT AND TRADEMARK OFFICE
CERTIFICATE OF CORRECTION

| | |
|---|---|
| PATENT NO. | : 7,839,586 B2 |
| APPLICATION NO. | : 12/232095 |
| DATED | : November 23, 2010 |
| INVENTOR(S) | : Yun Seok Woo et al. |

It is certified that error appears in the above-identified patent and that said Letters Patent is hereby corrected as shown below:

Column 8, line 64, delete "fiction" and insert --friction-- therefor.

Signed and Sealed this
Fifteenth Day of March, 2011

David J. Kappos
*Director of the United States Patent and Trademark Office*